US00RE36144E

United States Patent [19]

Spiegel

[11] E Patent Number: Re. 36,144

[45] Reissued Date of Patent: Mar. 16, 1999

[54] DEVICE FOR WASHING AN INKING UNIT PROVIDED AT A PRINTING PRESS

[75] Inventor: Nikolaus Spiegel, Walldorf, Germany

[73] Assignee: Heidelberger Druckmaschinen Aktiengesellschaft, Heidelberg, Germany

[21] Appl. No.: 755,332

[22] Filed: Nov. 22, 1996

Related U.S. Patent Documents

Reissue of:

[64] Patent No.: 5,365,849
Issued: Nov. 22, 1994
Appl. No.: 121,605
Filed: Sep. 14, 1993

[30] Foreign Application Priority Data

Sep. 18, 1992 [DE] Germany ..... 9212582 U

[51] Int. Cl.[6] ..... B41F 31/06; B41F 35/04

[52] U.S. Cl. ..... 101/350.2; 101/425; 101/483

[58] Field of Search ..... 101/423, 424, 101/425, 207, 208, 210, 350.1, 350.2, 350.5, 351.8, 363, 364, 365, 367, 483

[56] References Cited

U.S. PATENT DOCUMENTS

| | | | |
|---|---|---|---|
| 2,054,618 | 9/1936 | Ford | 101/425 |
| 2,199,469 | 5/1940 | Seel et al. | 101/425 |
| 2,970,541 | 2/1961 | Gegenheimer | 101/425 |
| 2,986,088 | 5/1961 | Chase et al. | 101/425 |
| 3,701,316 | 10/1972 | Sylvester et al. | 101/425 |
| 5,103,730 | 4/1992 | Sarda | 101/425 |
| 5,168,812 | 12/1992 | Sugiyama | 101/423 |
| 5,243,910 | 9/1993 | Burch | 101/425 |

FOREIGN PATENT DOCUMENTS

| | | | |
|---|---|---|---|
| 0414909 | 3/1991 | European Pat. Off. . | |
| 1561100 | 2/1970 | Germany . | |
| 0236053 | 5/1986 | Germany | 101/425 |
| 3606006 | 10/1986 | Germany | 101/425 |
| 7405190 | 12/1974 | Netherlands | 101/425 |

*Primary Examiner*—J. Reed Fisher
*Attorney, Agent, or Firm*—Nils H. Ljungman & Associates

[57] ABSTRACT

Device for washing an inking unit provided at a printing machine. A doctor-blade device is provided at a distributor roller of an arrangement of rollers positioned before the split in the primary ink flow, while at least another doctor-blade device is provided at a distributor roller among a set of inking rollers supplying a secondary branch of the primary ink flow to a rearwardly disposed set of ink applicator rollers, as viewed in the direction of rotation of the plate cylinder.

14 Claims, 2 Drawing Sheets

DEVICE FOR WASHING AN INKING UNIT PROVIDED AT A PRINTING PRESS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to a device for washing an inking unit provided at a printing machine. Such a printing press or machine can generally comprise at least one device for supplying a cleaning agent and another device for wiping off the used cleaning agent, soiled by ink residues, from an inking-unit roller.

2. Background Information

In a known cleaning device of the kind described above, as disclosed in Federal Republic of Germany Laid-Open Patent Application No. 36 06 006, devices are used which supply the cleaning agent and apply it onto the rollers. After a number of rotations of the inking unit, the ink residues adhering to the rollers are dissolved. Then, the cleaning agent which is soiled by the ink residues is wiped off by means of a doctor-blade device. Unfortunately, however, this process requires a number of rotations of the inking unit. With today's conventionally sized inking units comprising a plurality of ink rollers and with the modern washing agents which are based on vegetable oil, the wiping-off usually takes longer, and, during this time, the machine is not available for printing.

OBJECT OF THE INVENTION

Proceeding from the above facts, it is the object of the present invention to considerably reduce the wash-up time for the inking unit, even if modern washing agents are used.

SUMMARY OF THE INVENTION

According to the present invention, the above object can be achieved in that a doctor-blade device is preferably provided at a distributor roller of the arrangement of rollers which supply the ink flow before the ink flow is split, and that a further doctor-blade device is provided at, at least, one distributor roller of the last ink rollers, seen in direction of rotation of the plate cylinder. By virtue of this arrangement, the ink residues which have been dissolved by the washing agent can be wiped off in an essentially shorter time and the inking unit can be cleaned uniformly, even if washing agents based on vegetable oil, the evaporation of which takes longer, are used.

In summary, one aspect of the invention resides broadly in a printing press comprising: a frame; a plate cylinder being rotatably mounted on said frame; an ink reservoir for holding a supply of ink; an inking mechanism for transferring the ink between said ink reservoir and said plate cylinder during operation of said printing press; said inking mechanism comprising a plurality of inking rollers, at least one ink fountain roller and at least one transfer means for transferring ink between said ink fountain roller and at least one of said plurality of inking rollers; a plurality of ink applicator rollers for being engaged with said plate cylinder and for applying ink to said plate cylinder; said plurality of ink applicator rollers comprising a first set of at least one ink applicator roller and a second set of at least one ink applicator roller; said plurality of inking rollers comprising a roller arrangement, said roller arrangement comprising a first set of at least one inking roller and a second set of at least one inking roller; said plurality of inking roller further comprising a third set of at least one inking roller; said first set of at least one inking roller for providing ink to said first set of at least one ink applicator roller; said second set of at least one inking roller for providing ink to said second set of at least one ink applicator roller; bridge roller means being engaged with: at least one inking roller of said first set of at least one inking roller; and at least one inking roller of said second set of at least one inking roller; said third set of at least one inking roller extending between said at least one transfer means and said bridge roller means; said third set of at least one inking roller for providing a primary stream of ink to said bridge roller means, said bridge roller means being engaged with at least one inking roller of said third set of at least one inking roller; said bridge roller means for dividing said primary stream of ink and thence providing a first subsidiary stream of ink to said first set of at least one inking roller and a second subsidiary stream of ink to said second set of at least one inking roller; means for washing said plurality of inking rollers, said washing means comprising: means for supplying washing fluid to said plurality of inking rollers, said washing fluid for being propagated among said plurality of inking rollers to wash said plurality of inking rollers; first removing means, for removing propagated washing fluid directly from one inking roller of said third set of at least one inking roller; and second removing means, for removing propagated washing fluid directly from one inking roller of said roller arrangement.

BRIEF DESCRIPTION OF THE DRAWING

A specimen embodiment of the invention is schematically illustrated in the drawings, wherein.

DESCRIPTION OF THE PREFERRED EMBODIMENT

Figure 1:
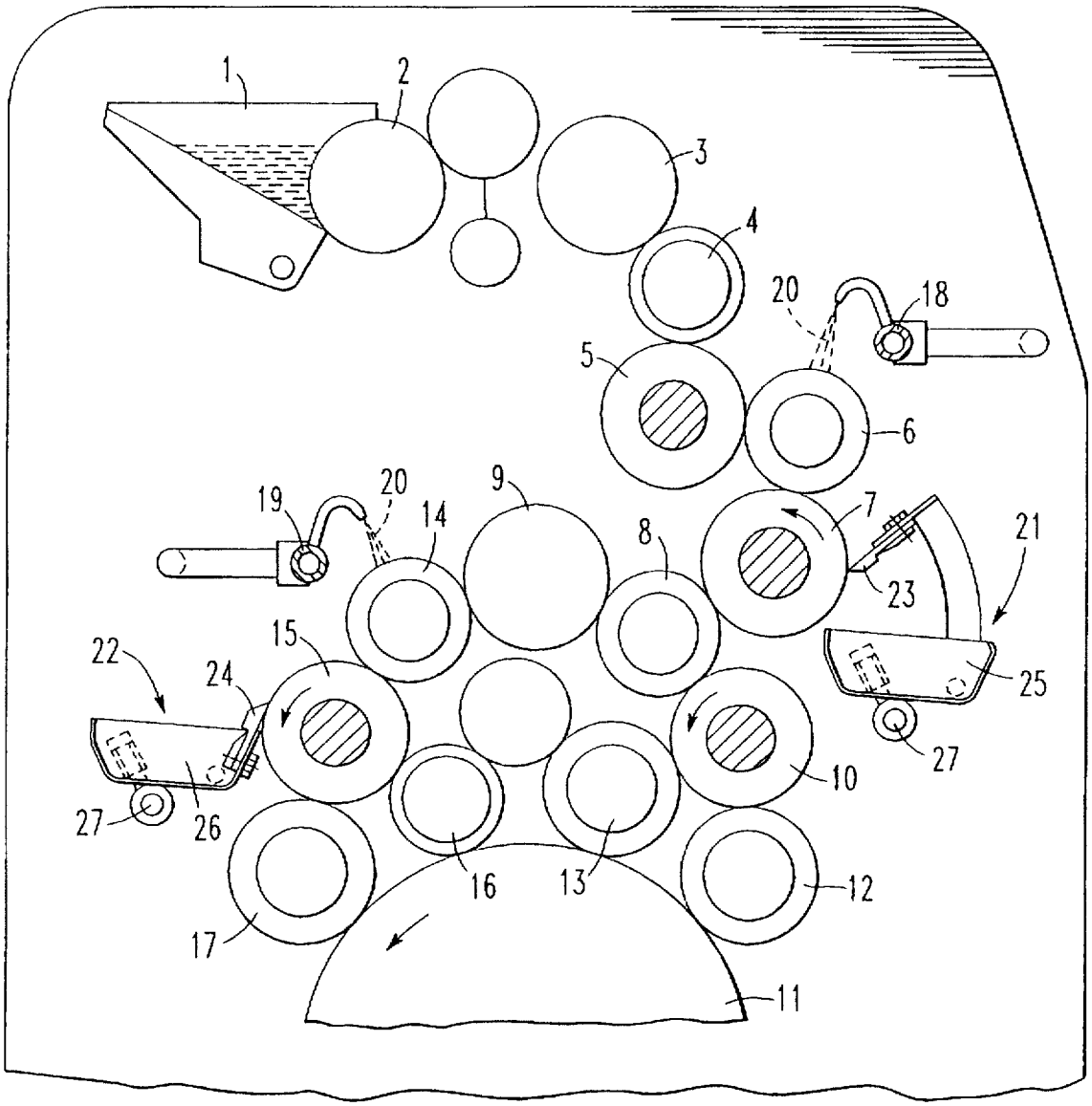
FIG. 1 shows a side elevational view of an inking unit according to the solution of the invention.

In a known manner, the inking unit shown in FIG. 1 essentially comprises an ink fountain 1 having a fountain roller 2 and preferably a plurality of ink rollers 3 through 6 via which the ink flow is fed to a distributor roller 7. The ink roller 8 cooperating with the distributor roller 7 can preferably split the ink flow and transfer the ink it onto further ink rollers 9 and 10, from where, as seen in direction of rotation of the plate cylinder 11:

the split ink flow preferably goes onto the plate-inking rollers 12 and 13 via the roller 10; and the ink can preferably be supplied from the ink roller 9 onto the two subsequent plate-inking rollers 16 and 17 via the ink roller 14 and the distributor roller 15.

It should be understood that, in the context of the present invention, a "distributor roller" may preferably be embodied by a roller which oscillates from side to side to distribute ink or another agent more evenly across another inking roller or rollers. Such "distributor rollers" +are well known to those of ordinary skill in the art and, as such, will not be described in further detail herein.

An advantage of the present invention is realized by assigning, for example, a respective device 18, 19 for supplying and applying the cleaning agent 20 to both the ink roller 6 and ink roller 14.

Thus, in other words, in accordance with a preferred embodiment of the present invention, two supplying devices 18 and 19 are preferably provided for supplying cleaning agent 20 to the rollers 3 through 15, to enable the washing of the inking rollers. Particularly, one supplying device 18 can preferably be mounted so as to supply cleaning agent 20 directly to inking roller 6, while another supplying device 19 can preferably be mounted so as to supply cleaning agent 20 directly to inking roller 14. With cleaning agent 20 having been applied to inking roller 6 and inking roller 14, several rotations of rollers 3 through 15 will generally result in the cleaning agent being propagated to essentially all of the rollers 3 through 15.

In accordance with a preferred embodiment of the present invention, a doctor-blade device 21, 22 is preferably assigned, respectively, to the distributor roller 7 and to the distributor roller 15. Each doctor-blade device 21, 22 preferably has a doctor blade 23, 24 by means of which the soiled cleaning agent can preferably be wiped off from the outer cylindrical surface of the respective distributor roller 7 or 15. The wiped-off agent can then preferably be collected in a vessel 25, 26 from where the wiped-off agent can be removed. Via a cam shaft 27, assigned to preferably each of the respective collecting vessels 25, 26, the doctor blade 23, 24 attached to the respective collecting vessel 25, 26 can preferably be engaged at the outer cylindrical surface of the respective distributor rollers 7, 15 and disengaged therefrom upon completion of the cleaning process.

Thus, in other words, in accordance with a preferred embodiment of the present invention, two doctor-blade arrangements 21, 22 are preferably provided for removing soiled cleaning agent off from distributor roller 7 and distributor roller 15, respectively. Each doctor-blade arrangement 21, 22 preferably includes a doctor blade 23, 24 for scraping, or wiping, soiled cleaning agent from the respective distributor roller 7, 15. Alternatively, instead of a single doctor blade extending across a length of each distributor roller 7, 15, each doctor-blade arrangement may conceivably include several adjacent doctor blades across a substantial portion of the respective distributor roller 7, 15.

Figure 2:
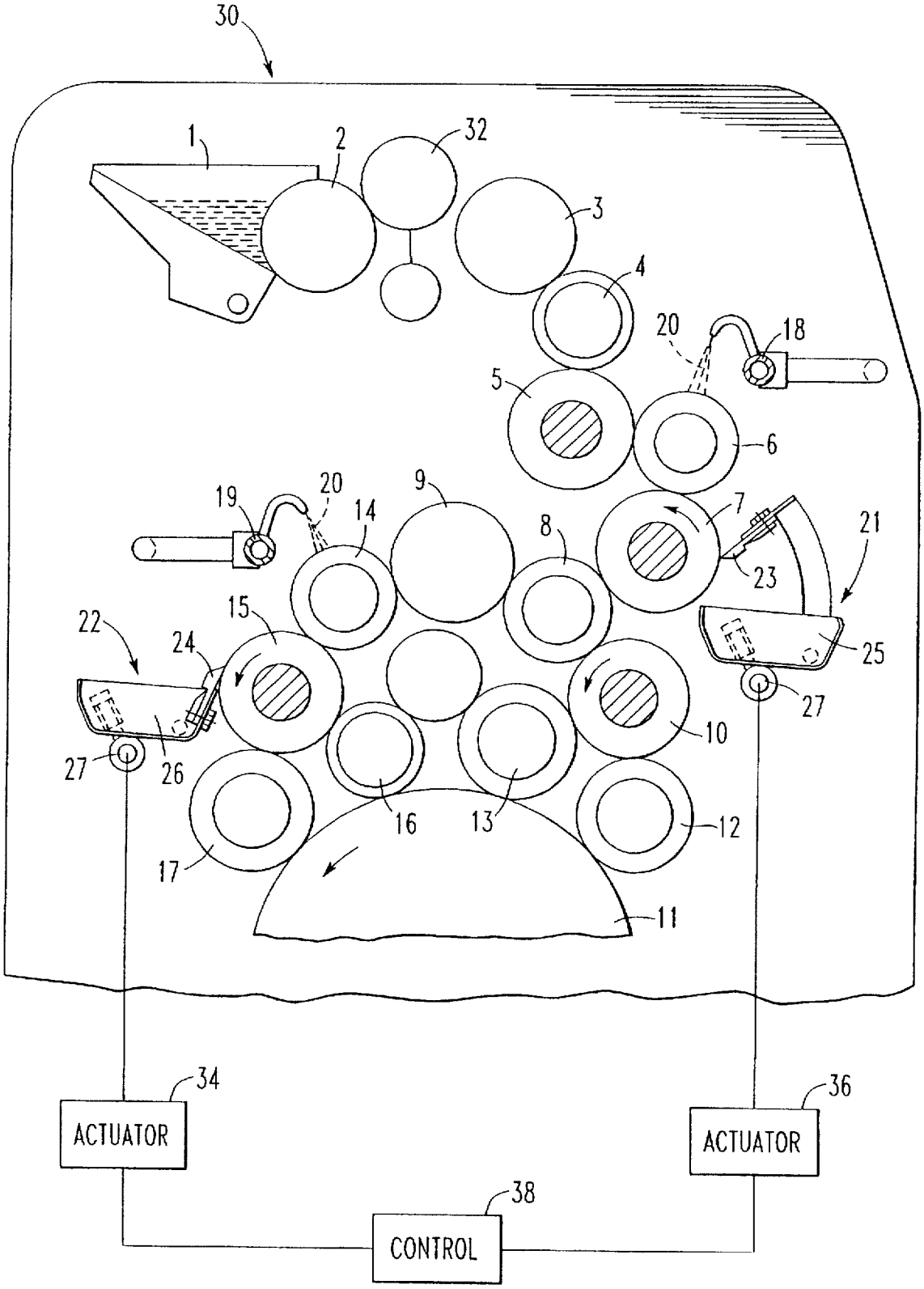
FIG. 2 is essentially the same view as FIG. 1, but illustrating additional components.

FIG. 2 illustrates a printing press frame 30, on which the various rollers and cylinders of the printing press according to the present invention may preferably be mounted. Also shown in FIG. 2 is a vibrator roller 32, positioned between ink fountain 1 and inking roller 3 and actuators 34 and 36 for doctor-blade devices 21 and 22, respectively. Each actuator 34, 36 can preferably be configured for selectively engaging and disengaging each respective doctor blade 23, 24 with respect to corresponding distributor rollers 7 and 15, respectively. A control arrangement 38 can also preferably be provided for controlling the engagement and disengagement of doctor blades 23, 24 via the respective actuators 34, 36. Control arrangement 38 may preferably be configured to coordinate the engagement and disengagement of doctor blades 23, 24 via the respective actuators 34, 36 when a washing operation is performed. Thus, it is conceivable, by means of control arrangement 38, to provide for simultaneously applying doctor blades 23, 24 to the surfaces of respective distributor rollers 7 and 15, or to do so in staggered fashion, whichever is desired.

One feature of the invention resides broadly in the device for washing an inking unit provided at a printing machine comprising at least one device for supplying the cleaning agent and a device for wiping off the cleaning agent, soiled by ink residues, from an inking-unit roller, characterized in that a doctor-blade device 21 is provided at a distributor roller 7 of the arrangement of rollers 3 through 7 for the purpose of supplying the ink flow before being split, and that a further doctor-blade device 22 is provided at, at least, one distributor roller 15 of the last ink roller 14, 16, 17, seen in direction of rotation of the plate cylinder 11.

Examples of general components for printing presses, which may be utilized in accordance with the embodiments of the present invention, may be found in the following U.S. Patents: U.S. Pat. No. 5,010,820, which issued to Löffler on Apr. 30, 1991; and U.S. Pat. No. 5,081,926, which issued to Rodi on Jan. 21, 1992.

Examples of washing apparatus for a printing press, and components thereof, which may be utilized in accordance with the embodiments of the present invention, may be found in the following U.S. Patents: U.S. Pat. No. 5,174,209, which issued to Rodi et al. on Dec. 29, 1992; and U.S. Pat. No. 5,174,210, which issued to Rodi et al. on Dec. 29, 1992.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A washing arrangement for washing [a plurality of inking rollers in a printing press, such a printing press comprising: a frame; a plate cylinder being rotatably mounted on said frame; an ink reservoir for holding a supply of ink;] an inking mechanism *in a printing press; said inking mechanism comprising a plurality of rollers* for transferring [the] ink [between said ink reservoir and said] *along an ink flow path to a* plate cylinder [during operation of said printing press]; said [inking mechanism comprising a] plurality of inking rollers[, at least one ink fountain roller and at least one transfer means for transferring ink between said ink fountain roller and at least one of said plurality of inking rollers; a plurality of ink applicator rollers for being engaged with said plate cylinder and for applying ink to said plate cylinder;] *comprising at least one roller for splitting said ink flow path from an initial primary ink flow path into at least a first subsidiary ink flow path and a second subsidiary ink flow path;* said plurality of [ink applicator] *inking* rollers comprising a first set of [at least one ink applicator roller and a second set of at least one ink applicator roller; said plurality of inking rollers comprising a roller arrangement, said roller arrangement comprising a first set of at least one inking roller and a second set of at least one inking roller; said plurality of inking rollers further comprising a third set of at least one inking roller; said first set of at least one inking roller for providing ink to said first set of at least one ink applicator roller; said second set of at least one inking roller for providing ink to said second set of at least one ink applicator roller;] *at least one inking roller for the transfer of ink along said first subsidiary ink flow path, and a second set of at least one inking roller for the transfer of ink along said second subsidiary ink flow path;* said plurality of inking rollers [further comprising bridge roller means, said bridge roller means being engaged with: at least one inking roller of said first set of at least one inking roller, and at least one inking roller of said second set of at least one inking roller; said third set of at least one inking roller for providing a primary stream of ink; means for dividing said primary stream of ink to provide a first subsidiary stream of ink to said first set of at least one inking roller and a second subsidiary stream of ink to said second set of at least one inking roller; said means for dividing said primary stream of ink comprising said bridge roller means; said third set of at least one inking roller extending between said at least one transfer means and said bridge roller means; said bridge roller means being engaged with at least one inking roller of said third set of at least one inking roller so as to receive said primary stream of ink] *comprising at least one distributor roller for transferring ink along the initial primary ink flow path, said second set of at least one inking roller comprising at least one additional distributor roller for transferring ink along said second subsidiary ink flow path; said second set of at least one inking roller being positioned with respect to said first set of at least one inking roller such that said second set of at least one inking roller is configured to transfer ink to said plate cylinder subsequent to said first set of at least one inking roller during a printing operation;* said washing arrangement comprising:

[means] *a device in the printing press* for supplying washing fluid to said plurality of inking rollers, said washing fluid for being transferred among the plurality of inking rollers to wash the plurality of inking rollers;

*a* first removing [means] *device*, for removing washing fluid [, having been transferred among the plurality of inking rollers to wash the plurality of inking rollers,] directly from one [inking roller of the third set of at least one inking] *of said at least one distributor* roller; and

*a* second removing [means] *device*, for removing washing fluid [, having been transferred among the plurality of inking rollers to wash the plurality of inking rollers,] directly from one [inking roller of the roller arrangement] *of said at least one additional distributor roller.*

[2. The washing arrangement according to claim 1, wherein:

said bridge roller means comprises a bridge roller for dividing said primary stream of ink into said first subsidiary stream of ink and said second subsidiary stream of ink; and said one inking roller of said third set of at least one inking roller, from which said first removing means removes washing fluid, is engaged with said bridge roller so as to transfer said primary stream of ink to said bridge roller.]

3. The washing arrangement according to claim [2] *1*, wherein *said first set of at least one inking roller and said second set of at least one inking roller each comprise at least one ink applicator roller to engage with said plate cylinder and to apply ink to said plate cylinder; and wherein:*

[said second removing means is for removing washing fluid directly from one inking roller of said second set of at least one inking roller;

said second set of at least one ink applicator roller is positioned with respect to said first set of at least one ink applicator roller such that said second set of at least one ink applicator roller is configured to transfer ink to said plate cylinder subsequent to said first set of at least one ink applicator roller during a printing operation; and said one inking roller of said second set of at least one inking roller is] *said at least one additional distributor roller is* engaged with *said* at least one ink applicator roller of said second set of at least one [ink applicator] *inking* roller.

[4. The washing arrangement according to claim 3, wherein:

said ink reservoir is disposed completely above said plate cylinder; and said inking mechanism is configured for transferring ink downwardly from said ink reservoir to said plate cylinder during operation of said printing press.]

[5. The printing press according to claim 4, wherein:

the one inking roller of the third set of at least one inking roller, from which said first removing means removes washing fluid, comprises a first distributor roller; and the one inking roller of the second set of at least one inking roller, from which said second removing means removes washing fluid, comprises a second distributor roller.]

6. The printing press according to claim [5] *3*, wherein:

said first removing [means] *device* comprises *a* first scraping [means,] *device* for scraping washing fluid directly from the one [inking roller of the third set] of *said* at least one [inking] *distributor* roller;

said second removing [means] *device* comprises *a* second scraping [means,] *device* for scraping washing fluid directly from the [one inking roller of the second set of at least] one [inking roller;

the at least one inking roller of the third set of at least one inking roller, with which the bridge roller is engaged, is the first distributor roller] *of said at least one additional distributor roller; and*

*said one of said at least one distributor roller from which said first removing device removes washing fluid, is engaged with said at least one ink flow path splitting roller so as to transfer said initial primary ink flow to said at least one ink flow path splitting roller.*

7. The printing press according to claim 6, wherein:

[the second distributor roller is for being engaged with at least one ink applicator roller of the second set of at least one ink applicator roller;]

said first scraping [means] *device* comprises *a* first doctor blade [means]; *and* said second scraping [means] *device* comprises *a* second doctor blade [means;

said means for supplying washing fluid comprises a first spray apparatus and a second spray apparatus;

the third set of at least one inking roller comprises:

a first inking roller for receiving ink from the ink transferring means;

a second inking roller being engaged with the first inking roller;

a third inking roller being engaged with the second inking roller;

a fourth inking roller being engaged with the third inking roller and with the first distributor roller; and the third inking roller comprising a third distributor roller;

said first spray apparatus is for being disposed adjacent the fourth inking roller, to spray washing fluid directly onto the fourth inking roller;

the bridge roller comprises a fifth inking roller;

the second set of at least one inking roller comprises:

a sixth inking roller being engaged with the fifth inking roller;

a seventh inking roller being engaged with the sixth inking roller and the second distributor roller;

said second spray apparatus is for being disposed adjacent the seventh inking roller, to spray washing fluid directly onto the seventh inking roller;

the first set of at least one inking roller comprises an eighth inking roller being engaged with the fifth inking roller and with at least one ink applicator roller of the first set of at least one ink applicator roller;

the first set of at least one ink applicator roller comprises a first ink applicator roller and a second ink applicator roller;

the eighth inking roller is for being engaged with both the first ink applicator roller and the second ink applicator roller;

the second set of at least one ink applicator roller comprises a third ink applicator roller and a fourth ink applicator roller;

the roller arrangement further comprises intermediate roller means for being engaged with both said second ink applicator roller and the third ink applicator roller;

the plate cylinder has a direction of rotation;

the first, second, third and fourth ink applicator rollers are arranged along the plate cylinder in the following order, as viewed in the direction of rotation of said plate cylinder:

the first ink applicator roller, the second ink applicator roller, the third ink applicator roller and the fourth ink applicator roller; and said washing arrangement further comprises:

said first removing means comprising a first collecting vessel for collecting residues scraped by said first doctor blade means from the first distributor roller;

said second removing means comprising a second collecting vessel for collecting residues scraped by said second doctor blade means from the second distributor roller;

said first doctor blade means extending from said first collecting vessel;

said second doctor blade means extending from said second collecting vessel;

said first removing means comprising first actuator means for selectively engaging and disengaging said first doctor blade means with the first distributor roller;

said second removing means comprising second actuator means for selectively engaging and disengaging said second doctor blade means with the second distributor roller;

said first actuator means comprising:

first cam shaft means being connected with said first collecting vessel to move said first collecting vessel to engage and disengage said first doctor blade means with the first distributor roller; and means for displacing said first cam shaft means to move said second collecting vessel; said second actuator means comprising:

second cam shaft means being connected with said second collecting vessel to move said second collecting vessel to engage and disengage said second doctor blade means with the second distributor roller; and means for displacing said second cam shaft means to move said second collecting vessel; and means for coordinating said first actuator means and said second actuator means].

8. A printing press comprising:

a frame;

a plate cylinder being rotatably mounted on said frame;

[an ink reservoir for holding] a supply of ink;

an inking mechanism for transferring the ink [between said ink reservoir and] *to* said plate cylinder [during operation of said printing press];

said inking mechanism comprising a plurality of inking rollers[, at least one ink fountain roller and at least one transfer means for transferring ink between said ink fountain roller and at least one of said plurality of inking rollers];

*said plurality of inking rollers comprising* a plurality of ink applicator rollers for being engaged with said plate cylinder and for applying ink to said plate cylinder;

[said plurality of ink applicator rollers comprising a first set of at least one ink applicator roller and a second set of at least one ink applicator roller;]

said plurality of inking rollers comprising [a roller arrangement, said roller arrangement comprising] a first set of at least one inking roller and a second set of at least one inking roller;

*said first set of at least one inking roller and said second set of at least one inking roller each comprising at least one of said plurality of ink applicator rollers;*

*said second set of at least one inking roller being positioned with respect to said first set of at least one inking roller such that said at least one ink applicator roller of said second set of at least one inking roller is configured to transfer ink to said plate cylinder subsequent to said at least one ink applicator roller of said first set of at least one inking roller during a printing operation;* said plurality of inking rollers further comprising a third set of at least one inking roller;

[said first set of at least one inking roller for providing ink to said first set of at least one ink applicator roller;

said second set of at least one inking roller for providing ink to said second set of at least one ink applicator roller;

said plurality of inking rollers further comprising bridge roller means, said bridge roller means being engaged with:

at least one inking roller of said first set of at least one inking roller; and at least one inking roller of said second set of at least one inking roller;]

said third set of at least one inking roller for providing a primary stream of ink;

[means for dividing] *at least one roller of said third set of at least one inking roller being configured and disposed to divide* said primary stream of ink to provide a first subsidiary stream of ink to said first set of at least one inking roller and a second subsidiary stream of ink to said second set of at least one inking roller;

[said means for dividing said primary stream of ink comprising said bridge roller means;]

*said third set of at least one inking roller and said second set of at least one inking roller each comprising at least one distributor roller;*

[said third set of at least one inking roller extending between said at least one transfer means and said bridge roller means;

said bridge roller means being engaged with at least one inking roller of said third set of at least one inking roller so as to receive said primary stream of ink;

means] *apparatus* for washing said plurality of inking rollers, said washing [means] *apparatus* comprising:

[means] *a device in said printing press* for supplying washing fluid to said plurality of inking rollers, said washing fluid for being transferred among said plurality of inking rollers to wash said plurality of inking rollers;

*a* first removing [means] *device*, for removing washing fluid, having been transferred among said plurality of inking rollers, directly from one [inking roller] *of said at least one distributor roller* of said third set of at least one inking roller; and

*a* second removing [means] *device*, for removing washing fluid, having been transferred among said plurality of inking rollers, directly from one [inking roller of said roller arrangement] *of said at least one distributor roller of said second set of at least one inking roller*.

9. The printing press according to claim [1] *8*, wherein:

[said bridge roller means comprises a bridge roller for dividing said primary stream of ink into said first subsidiary stream of ink and said second subsidiary stream of ink; and]

said one [inking] *of said at least one distributor* roller of said third set of at least one inking roller, from which said first removing [means] *device* removes washing fluid, is engaged with said [bridge] *at least one ink dividing* roller *of said third set of at least one inking roller* so as to transfer said primary stream of ink to said [bridge roller] *at least one ink dividing roller*.

10. The printing press according to claim 9, wherein:

[said second removing means is for removing washing fluid directly from one inking roller of said second set of at least one inking roller;

said second set of at least one ink applicator roller is positioned with respect to said first set of at least one ink applicator roller such that said second set of at least one ink applicator roller is configured to transfer ink to said plate cylinder subsequent to said first set of at least one ink applicator roller during a printing operation; and said one inking roller of said second set of at least one inking roller is] *said one of said at least one distributor roller of said second set of at least one inking roller is* engaged with at least one *of said at least one* ink applicator roller of said second set of at least one [ink applicator] *inking* roller.

[11. The printing press according to claim 10, wherein:

said ink reservoir is disposed completely above said plate cylinder; and said inking mechanism is configured for transferring ink downwardly from said ink reservoir to said plate cylinder during operation of said printing press.]

[12. The printing press according to claim 11, wherein:

said one inking roller of said third set of at least one inking roller, from which said first removing means removes washing fluid, comprises a first distributor roller; and said one inking roller of said second set of at least one inking roller, from which said second removing means removes washing fluid, comprises a second distributor roller.]

13. The printing press according to claim [12] *10*, wherein:

said first removing [means] *device* comprises *a* first scraping [means] *device*, for scraping washing fluid directly from *said one of* said [one inking roller] *at least one distributor roller* of said third set of at least one inking roller; *and* said second removing [means] *device* comprises [first] *a second* scraping [means] *device*, for scraping washing fluid directly from *said one of* said [one inking roller] *at least one distributor roller* of said second set of at least one inking roller[; and said at least one inking roller of said third set of at least one inking roller, with which said bridge roller is engaged, is said first distributor roller].

14. The printing press according to claim 13, wherein:

[said second distributor roller is for being engaged with at least one ink applicator roller of said second set of at least one ink applicator roller;]

said first scraping [means] *device* comprises *a* first doctor blade [means]; *and* said second scraping [means] *device* comprises *a* second doctor blade [means;

said means for supplying washing fluid comprises a first spray apparatus and a second spray apparatus;

said third set of at least one inking roller comprises:

a first inking roller for receiving ink from said ink transferring means;

a second inking roller being engaged with said first inking roller;

a third inking roller being engaged with said second inking roller;

a fourth inking roller being engaged with said third inking roller and with said first distributor roller; and said third inking roller comprising a third distributor roller;

said first spray apparatus is disposed adjacent said fourth inking roller and is configured for spraying washing fluid directly onto said fourth inking roller;

said bridge roller comprises a fifth inking roller;

said second set of at least one inking roller comprises:

a sixth inking roller being engaged with said fifth inking roller;

a seventh inking roller being engaged with said sixth inking roller and said second distributor roller;

said second spray apparatus is disposed adjacent said seventh inking roller and is configured for spraying washing fluid directly onto said seventh inking roller;

said first set of at least one inking roller comprises an eighth inking roller being engaged with said fifth inking roller and with at least one ink applicator roller of said first set of at least one ink applicator roller;

said first set of at least one ink applicator roller comprises a first ink applicator roller and a second ink applicator roller;

said eighth inking roller is for being engaged with both said first ink applicator roller and said second ink applicator roller;

said second set of at least one ink applicator roller comprises a third ink applicator roller and a fourth ink applicator roller;

said roller arrangement further comprises intermediate roller means for being engaged with both said second ink applicator roller and said third ink applicator roller;

said plate cylinder has a direction of rotation;

said first, second, third and fourth ink applicator rollers are arranged along the plate cylinder in the following order, as viewed in the direction of rotation of said plate cylinder:

said first ink applicator roller, said second ink applicator roller, said third ink applicator roller and said fourth ink applicator roller; and said washing apparatus further comprises:

said first removing means comprising a first collecting vessel for collecting residues scraped by said first doctor blade means from said first distributor roller;

said second removing means comprising a second collecting vessel for collecting residues scraped by said second doctor blade means from said second distributor roller;

said first doctor blade means extending from said first collecting vessel;

said second doctor blade means extending from said second collecting vessel;

said first removing means comprising first actuator means for selectively engaging and disengaging said first doctor blade means with said first distributor roller;

said second removing means comprising second actuator means for selectively engaging and disengaging said second doctor blade means with said second distributor roller;

said first actuator means comprising:

first cam shaft means being connected with said first collecting vessel to move said first collecting vessel to engage and disengage said first doctor blade means with said first distributor roller; and means for displacing said first cam shaft means to move said second collecting vessel; said second actuator means comprising:

second cam shaft means being connected with said second collecting vessel to move said second collecting vessel to engage and disengage said second doctor blade means with said second distributor roller; and means for displacing said second cam shaft means to move said second collecting vessel; and means for coordinating said first actuator means and said second actuator means].

15. Method of washing a plurality of inking rollers in a printing press, such a printing press comprising: [a frame;] a plate cylinder [being rotatably mounted on the frame]; [an ink reservoir for holding] a supply of ink; an inking mechanism for transferring the ink [between the ink reservoir and] *to* the plate cylinder [during operation of the printing press]; the inking mechanism comprising a plurality of inking rollers, [at least one ink fountain roller and at least one transfer means for transferring ink between the ink fountain roller and at least one of the plurality of inking rollers;] *said plurality of inking rollers comprising* a [plurality of] *first set and a second set of at least one* ink applicator [rollers] *roller* for being engaged with the plate cylinder and for applying ink to the plate cylinder; [the plurality of ink applicator rollers comprising a first set of at least one ink applicator roller and a second set of at least one ink applicator roller;] the plurality of inking rollers comprising [a roller arrangement, the roller arrangement comprising] a first set of at least one inking roller and a second set of at least one inking roller; the plurality of inking rollers further comprising a third set of at least one inking roller; the first set of at least one inking roller for providing ink to the first set of at least one ink applicator roller; the second set of at least one inking roller for providing ink to the second set of at least one ink applicator roller; [the plurality of inking rollers further comprising bridge roller means, the bridge roller means being engaged with: at least one inking roller of the first set of at least one inking roller, and at least one inking roller of the second set of at least one inking roller;] the third set of at least one inking roller for providing a primary stream of ink; [means for dividing] *said third set of at least one inking roller comprising at least one roller being configured and disposed to divide* the primary stream of ink to provide a first subsidiary stream of ink to the first set of at least one inking roller and a second subsidiary stream of ink to the second set of at least one inking roller; [the means for dividing the primary stream of ink comprising the bridge roller means; the third set of at least one inking roller extending between the at least one transfer means and the bridge roller means; the bridge roller means being engaged with at least one inking roller of the third set of at least one inking roller;] *said second set of at least one inking roller and said third set of at least one inking roller each comprising at least one distributor roller; said second set of at least one ink applicator roller being positioned with respect to said first set of at least one ink applicator roller such that said second set of at least one ink applicator roller is configured to transfer ink to said plate cylinder subsequent to said first set of at least one ink applicator roller during a printing operation;* said method comprising the steps of:

providing [means] *a device in said printing press* for supplying washing fluid to the plurality of inking rollers, the washing fluid for being transferred among the plurality of inking rollers to wash the plurality of inking rollers;

providing *a* first removing [means] *device*, for removing washing fluid, having been transferred among the plurality of inking rollers to wash the plurality of inking rollers, directly from one [inking roller] *of the at least one distributor roller* of the third set of at least one inking roller;

providing second removing [means] *device*, for removing washing fluid, having been transferred among the plurality of inking rollers to wash the plurality of inking rollers, directly from one [inking roller of the roller arrangement] *of the at least one distributor roller of the second set of at least one inking roller*;

transferring ink [from the ink reservoir] to the plate cylinder by way of the following steps:

transferring the primary stream of ink to the [bridge roller means] *at least one ink dividing roller* by way of a route of travel which extends:

from the ink [reservoir] *supply* to [the ink fountain roller;

thereafter to the at least one transfer means;

thereafter to] the third set of at least one inking roller *including said at least one ink dividing roller*; [and thereafter to the bridge roller means;]

dividing the primary stream of ink, with the [bridge roller means] *at least one ink dividing roller*, into the first subsidiary stream of ink and the second subsidiary stream of ink;

transferring the first subsidiary stream of ink to the plate cylinder by way of a route of travel which extends:

from the [bridge roller means] *at least one ink dividing roller* to the first set of at least one inking roller;

thereafter to the first set of at least one ink applicator roller; and thereafter to the plate cylinder; transferring the second subsidiary stream of ink to the plate cylinder by way of a route of travel which extends:

from the [bridge roller means] *at least one ink dividing roller* to the second set of at least one inking roller;

thereafter to the second set of at least one ink applicator roller; and thereafter to the plate cylinder;

conducting a washing operation by way of the following steps:

supplying washing fluid to the plurality of inking rollers with the [supplying means] *device to supply washing fluid*;

transferring the washing fluid among the plurality of inking rollers to wash the plurality of inking rollers; and subsequent to said transferring step:

removing, with the first removing [means] *device*, washing fluid directly from one [inking] *of said at least one distributor* roller of the third set of at least one inking roller; and removing, with the second removing [means] *device*, washing fluid directly from one [inking] *of said at least one distributor* roller of the [roller arrangement] *second set of at least one inking roller.*

16. The method according to claim 15, wherein:

[the bridge roller means comprises a bridge roller for dividing the primary stream of ink into the first subsidiary stream of ink and the second subsidiary stream of ink;

said step of dividing the primary stream of ink comprises dividing the primary stream of ink, with the bridge roller, into the first subsidiary stream of ink and the second subsidiary stream of ink; and]

*said one of* the *at least* one [inking] *distributor* roller of the third set of at least one inking roller, from which the first removing [means] *device* removes washing fluid, is engaged with the [bridge] *at least one ink dividing* roller *of the third set of at least one inking roller* so as to transfer the primary stream of ink to the [bridge roller] *at least one ink dividing roller.*

17. The method according to claim 16, wherein [said step of removing washing fluid with the second removing means comprises removing washing fluid directly from one inking roller of the second set of at least one inking roller;

the second set of at least one ink applicator roller is positioned with respect to the first set of at least one ink applicator roller such that the second set of at least one ink applicator roller is configured to transfer ink to the plate cylinder subsequent to the first set of at least one ink applicator roller during a printing operation; and]

the one [inking] *of the at least one distributor* roller of the second set of at least one inking roller is engaged with at least one ink applicator roller of the second set of at least one [ink applicator] *inking* roller.

18. The method according to claim 17, wherein[:

the ink reservoir is disposed completely above the plate cylinder;

the step of transferring ink from the ink reservoir to the plate cylinder comprises transferring ink downwardly from the ink reservoir to the plate cylinder;]

said method further comprises the steps of:

providing means for selectively engaging the first removing [means] *device* with the one [inking] *of said at least one distributor* roller of the third set of at least one inking roller solely during a washing operation;

providing means for selectively engaging the second removing [means] *device* with the one [inking] *of said at least one distributor* roller of the *second set of at least one inking* roller [arrangement] solely during a washing operation; and performing the following additional steps during said washing operation:

engaging the first removing [means] *device* with the one [inking] *of said at least one distributor* roller of the third set of at least one inking roller prior to the step of removing washing fluid with the first removing [means] *device*; and engaging the second removing [means] *device* with the one [inking] *of said at least one distributor* roller of the *second set of at least one inking* roller [arrangement] prior to the step of removing washing fluid with the second removing [means] *device*; and performing the steps of removing washing fluid with the first removing [means] *device* and removing washing fluid with the second removing [means] *device* simultaneously to minimize the time occupied by said washing operation.

[19. The method according to claim 18, wherein:

the one inking roller of the third set of at least one inking roller, from which the first removing means removes washing fluid, comprises a first distributor roller; and the one inking roller of the second set of at least one inking roller, from which the second removing means removes washing fluid, comprises a second distributor roller.]

20. The method according to claim [19] *18*, wherein:

the first removing [means] *device* comprises [first scraping means, for scraping washing fluid directly from the one inking roller of the third set of at least one inking roller] *a first doctor blade; and* the second removing [means] *device* comprises [second scraping means, for scraping washing fluid directly from the one inking roller of the second set of at least one inking roller;

said step of removing washing fluid with the first removing means comprises scraping washing fluid directly from the one inking roller of the third set of at least one inking roller;

said step of removing washing fluid with the second removing means comprises the step of scraping washing fluid directly from the one inking roller of the second set of at least one inking roller;

the at least one inking roller of the third set of at least one inking roller, with which the bridge roller is engaged, is the first distributor roller;

the second distributor roller is for being engaged with at least one ink applicator roller of the second set of at least one ink applicator roller;

the first scraping means comprises first doctor blade means;

the second scraping means comprises second doctor blade means;

the means for supplying washing fluid comprises a first spray apparatus and a second spray apparatus;

the third set of at least one inking roller comprises:

a first inking roller for receiving ink from the ink transferring means;

a second inking roller being engaged with the first inking roller;

a third inking roller being engaged with the second inking roller;

a fourth inking roller being engaged with the third inking roller and with the first distributor roller; and the third inking roller comprising a third distributor roller;

the first spray apparatus is for being disposed adjacent the fourth inking roller, and said step of supplying washing fluid comprises spraying washing fluid directly onto the fourth inking roller with the first spray apparatus;

the bridge roller comprises a fifth inking roller; the second set of at least one inking roller comprises:

a sixth inking roller being engaged with the fifth inking roller;

a seventh inking roller being engaged with the sixth inking roller and the second distributor roller;

the second spray apparatus is for being disposed adjacent the seventh inking roller, and said step of supplying washing fluid comprises spraying washing fluid directly onto the seventh inking roller with the second spraying apparatus;

the first set of at least one inking roller comprises an eighth inking roller being engaged with the fifth inking roller and with at least one ink applicator roller of the first set of at least one ink applicator roller;

the first set of at least one ink applicator roller comprises a first ink applicator roller and a second ink applicator roller;

the eighth inking roller is for being engaged with both the first ink applicator roller and the second ink applicator roller;

the second set of at least one ink applicator roller comprises a third ink applicator roller and a fourth ink applicator roller;

the roller arrangement further comprises intermediate roller means for being engaged with both the second ink applicator roller and the third ink applicator roller;

the plate cylinder has a direction of rotation;

the first, second, third and fourth ink applicator rollers are arranged along the plate cylinder in the following order, as viewed in the direction of rotation of the plate cylinder:

the first ink applicator roller, the second ink applicator roller, the third ink applicator roller and the fourth ink applicator roller; and the washing arrangement further comprises:

the first removing means comprising a first collecting vessel for collecting residues scraped by the first doctor blade means from the first distributor roller;

the second removing means comprising a second collecting vessel for collecting residues scraped by the second doctor blade means from the second distributor roller;

the first doctor blade means extending from the first collecting vessel;

the second doctor blade means extending from the second collecting vessel;

the means for selectively engaging the first removing means comprising first actuator means for selectively engaging and disengaging the first doctor blade means with the first distributor roller;

the means for selectively engaging the second removing means comprising second actuator means for selectively engaging and disengaging the second doctor blade means with the second distributor roller;

the first actuator means comprising:

first cam shaft means being connected with the first collecting vessel to move the first collecting vessel to engage and disengage the first doctor blade means with the first distributor roller; and means for displacing the first cam shaft means to move the second collecting vessel; the second actuator means comprising:

second cam shaft means being connected with the second collecting vessel to move the second collecting vessel to engage and disengage the second doctor blade means with the second distributor roller; and means for displacing the second cam shaft means to move the second collecting vessel; and means for coordinating the first actuator means and the second actuator means] *a second doctor blade.*

* * * * *